United States Patent
Bae et al.

(10) Patent No.: US 10,197,861 B1
(45) Date of Patent: Feb. 5, 2019

(54) LIQUID CRYSTAL DISPLAY

(71) Applicant: Samsung Display Co., Ltd., Yongin-si (KR)

(72) Inventors: Kwang Soo Bae, Suwon-si (KR); Sung Man Kim, Seoul (KR); Jung Suk Bang, Seoul (KR); Min Jeong Oh, Gimpo-si (KR); Bo Ram Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/871,447

(22) Filed: Jan. 15, 2018

(30) Foreign Application Priority Data

Jul. 25, 2017 (KR) .......................... 10-2017-0094396

(51) Int. Cl.
*G02F 1/1335* (2006.01)
*G02F 1/1337* (2006.01)
*G02F 1/1343* (2006.01)

(52) U.S. Cl.
CPC ...... *G02F 1/133711* (2013.01); *G02F 1/1343* (2013.01); *G02F 1/133512* (2013.01)

(58) Field of Classification Search
CPC ................................................ G02F 1/133512
USPC .......................................................... 349/110
See application file for complete search history.

(56) References Cited

U.S. PATENT DOCUMENTS 9,535,291 B2   1/2017 Yang et al.
2004/0125251 A1   7/2004 Kim 2016/0291409 A1   10/2016 Shin et al.
2017/0108739 A1   4/2017 Beon et al.
2017/0363915 A1*  12/2017 Song ................. G02F 1/133512

FOREIGN PATENT DOCUMENTS

KR   10-2004-0062146   7/2004
KR   10-2017-0039064   4/2017

OTHER PUBLICATIONS

Extended European Search Report dated Aug. 22, 2018, in European Patent Application No. 18170932.0.

* cited by examiner

*Primary Examiner* — Phu Vu

(74) *Attorney, Agent, or Firm* — H.C. Park & Associates, PLC

(57) ABSTRACT

A liquid crystal display device includes a first substrate (FS) on which pixel regions are defined, a second substrate (SS) facing the FS, an alignment film disposed on a surface of the FS facing the SS, a wavelength conversion layer disposed on a surface of the SS facing the FS, a transmissive layer disposed on the surface of SS, a common electrode disposed on surfaces of the wavelength conversion layer and the transmissive layer facing the FS, a light-blocking member disposed on a surface of the common electrode facing the FS, and a liquid crystal layer between the alignment film and the light-blocking member. Each pixel region among the pixel regions includes: a pixel electrode disposed on the surface of the FS; an opening region in the light-blocking member; and a pixel overlap region outside the opening region, the pixel electrode overlapping the light-blocking member in the pixel overlap region.

20 Claims, 11 Drawing Sheets

LIQUID CRYSTAL DISPLAY

CROSS-REFERENCE TO RELATED APPLICATION

This application claims priority from and the benefit of Korean Patent Application No. 10-2017-0094396, filed Jul. 25, 2017, which is hereby incorporated by reference for all purposes as if fully set forth herein.

BACKGROUND

Field

The disclosure generally relates to display devices, and, more particularly, to liquid crystal displays.

Discussion

With the development of multimedia, display devices are becoming increasingly important. Accordingly, various types of display devices, such as liquid crystal displays (LCDs) and organic light-emitting displays (OLEDs), are being used. Of these display devices, LCDs are a widely used type of flat panel display. An LCD includes field generating electrodes, such as pixel electrodes and a common electrode, and a liquid crystal layer. Voltages are applied to the field generating electrodes to generate an electric field in the liquid crystal layer. In this manner, the alignment of liquid crystal molecules of the liquid crystal layer is determined, and polarization of incident light is controlled. As a result, a desired image is displayed via the LCD.

In vertically aligned-mode LCDs among various types of LCDs, long axes of liquid crystal molecules are aligned perpendicular to upper and lower display panels when no electric field is applied. Vertically aligned-mode LCDs are drawing attention due to a relatively high contrast ratio and easy implementation of a wide reference viewing angle.

Also, LCDs may use a fluorescent substance or a phosphor. When receiving light, the fluorescent substance or the phosphor emits light of a determined wavelength band to realize a color. A display device using a fluorescent substance or a phosphor has a relatively wide viewing angle. Accordingly, this ensures freedom in the design for increasing the transmittance of the display device. A need, however, exists for a design capable of maximizing the transmittance of a display device.

The above information disclosed in this section is only for understanding the background of the inventive concepts, and, therefore, may contain information that does not form prior art.

SUMMARY

Some exemplary embodiments are capable of providing a liquid crystal display (LCD) having increased (e.g., maximized) transmittance.

Additional aspects will be set forth in the detailed description which follows, and, in part, will be apparent from the disclosure, or may be learned by practice of the inventive concepts.

According to some exemplary embodiments, a liquid crystal display device includes a first substrate, a second substrate, an alignment film, a wavelength conversion layer, a transmissive layer, a common electrode, a light-blocking member, and a liquid crystal layer. Pixel regions are defined on the first substrate. The second substrate faces the first substrate. The alignment film is disposed on a surface of the first substrate that faces the second substrate. The wavelength conversion layer is disposed on a surface of the second substrate that faces the first substrate. The transmissive layer is disposed on the surface of the second substrate. The common electrode is disposed on surfaces of the wavelength conversion layer and the transmissive layer that face the first substrate. The light-blocking member is disposed on a surface of the common electrode that faces the first substrate. The liquid crystal layer is disposed between the alignment film and the light-blocking member. Each pixel region among the pixel regions includes: a pixel electrode disposed on the surface of the first substrate; an opening region in the light-blocking member; and a pixel overlap region outside the opening region, the pixel electrode overlapping the light-blocking member in the pixel overlap region.

According to some exemplary embodiments, a liquid crystal display includes a first substrate, a second substrate, an alignment film, a wavelength conversion layer, a transmissive layer, a common electrode, a liquid crystal layer, and a light-blocking member. Pixel regions are defined on the first substrate. The second substrate faces the first substrate. The alignment film is disposed on a surface of the first substrate that faces the second substrate. The wavelength conversion layer is disposed on a surface of the second substrate that faces the first substrate. The transmissive layer is disposed on the surface of the second substrate. The common electrode is disposed on surfaces of the wavelength conversion layer and the transmissive layer that face the first substrate. The liquid crystal layer is disposed between the alignment film and the common electrode. The light-blocking member is disposed between the first substrate and the second substrate. Each pixel region among the pixel regions includes a pixel electrode disposed on the surface of the first substrate, and an opening region in the light-blocking member. The common electrode includes a slit pattern defining an opening in the common electrode, the slit pattern being adjacent to a first side of the opening region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
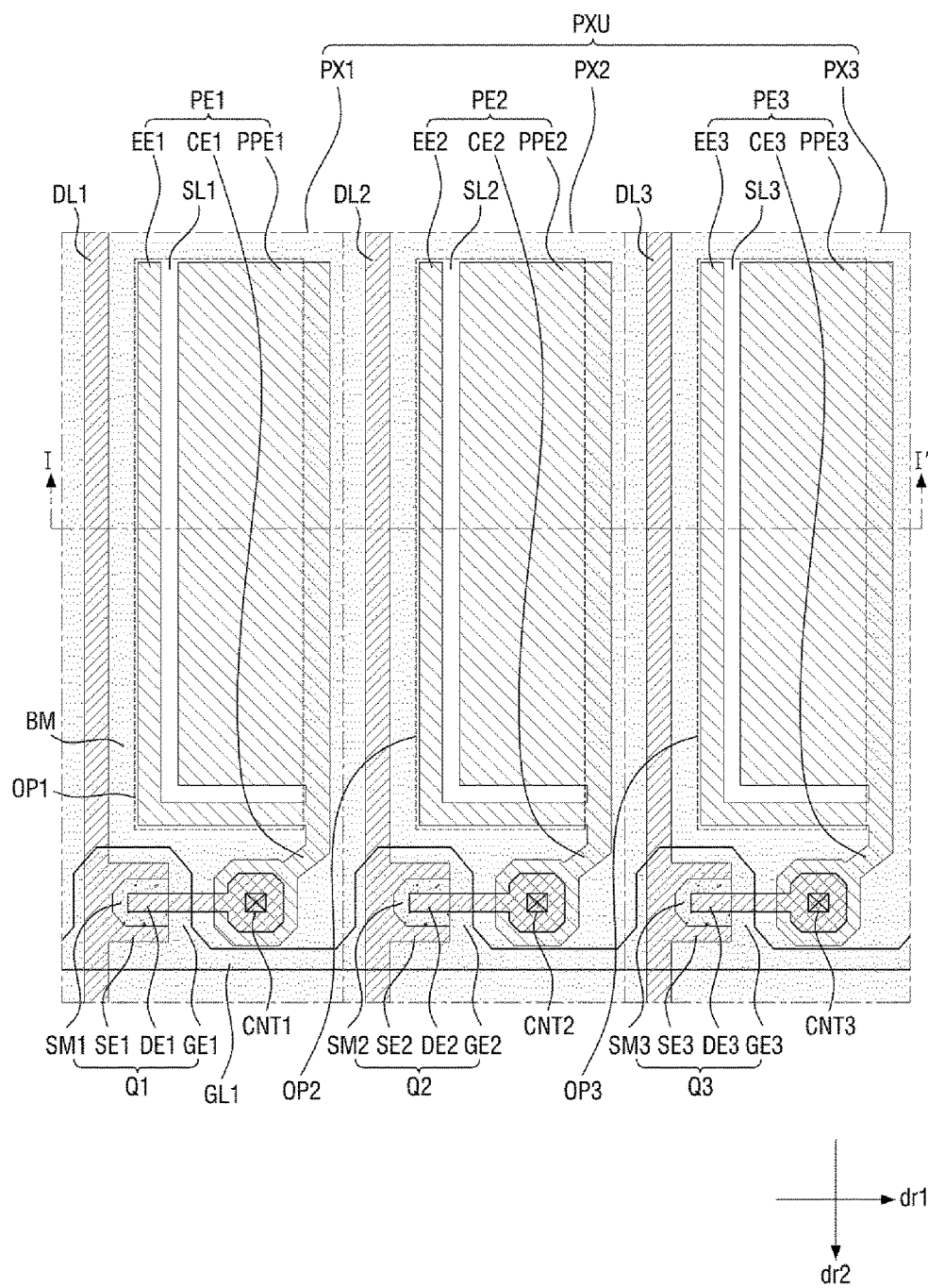
FIG. 1 is a layout view of a pixel unit according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used to herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
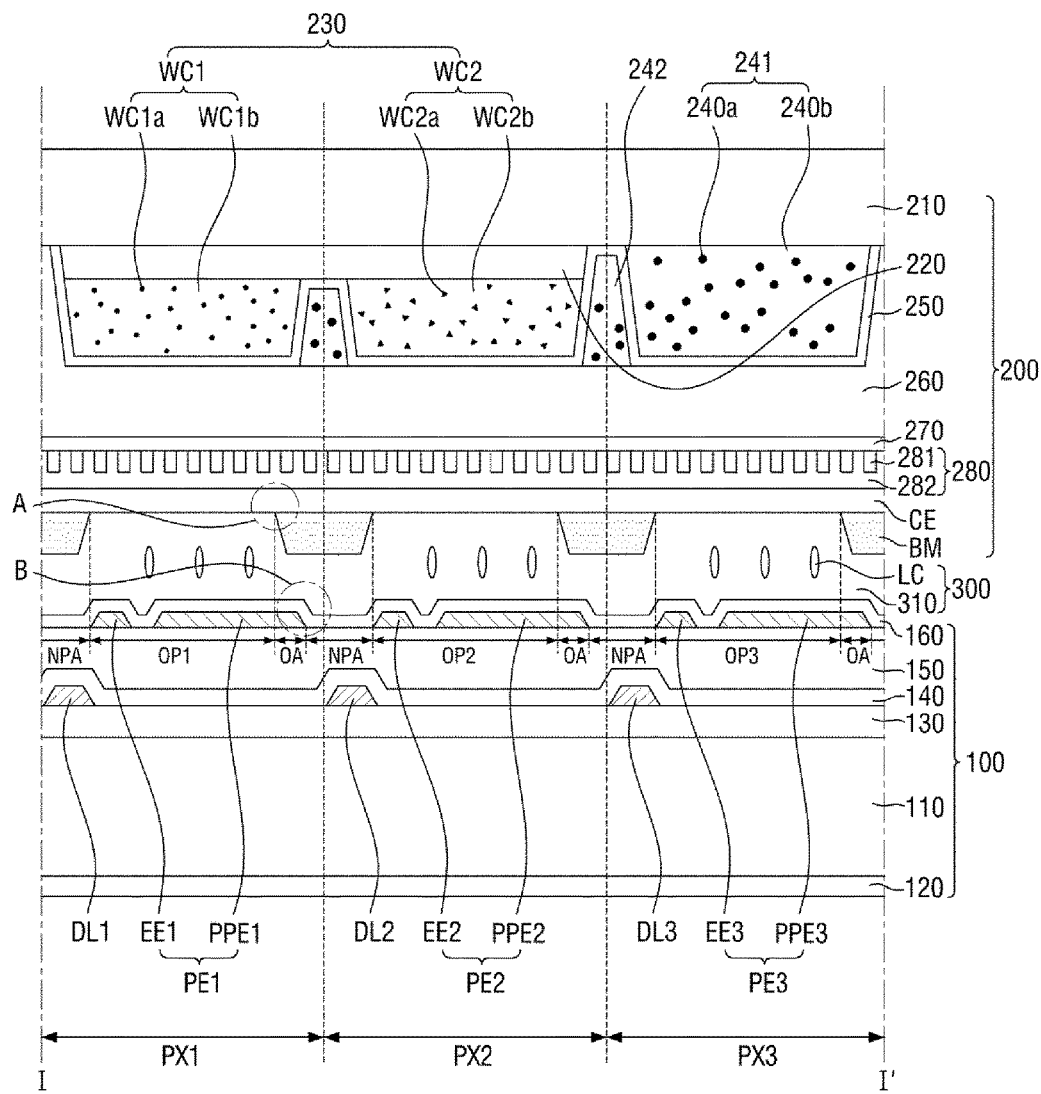
FIG. 2 is a cross-sectional view taken along sectional line I-I' of FIG. 1 according to some exemplary embodiments.

FIG. 1 is a layout view of a pixel unit PXU according to some exemplary embodiments. FIG. 2 is a cross-sectional view taken along sectional line I-I' of FIG. 1 according to some exemplary embodiments.

Referring to FIGS. 1 and 2, a display device includes a first (e.g., lower) display panel 100, a second (e.g., upper) display panel 200, and a liquid crystal layer 300. Here, "lower" and "upper" will be described based on the orientation shown in FIG. 1. An upper side of a lower substrate 110 refers to a direction toward an upper substrate 210, and a lower side of the lower substrate 110 refers to a direction opposite the direction toward the upper substrate 210. In addition, an upper side of the upper substrate 210 refers to a direction toward the lower substrate 110, and a lower side of the upper substrate 210 refers to a direction opposite the direction toward the lower substrate 110. The lower display panel 100 may be placed to face the upper display panel 200. The liquid crystal layer 300 may be interposed between the lower display panel 100 and the upper display panel 200, and may include a plurality of liquid crystal molecules LC. In some embodiments, the lower display panel 100 may be bonded to the upper display panel 200 by sealing.

The liquid crystal display includes a plurality of pixel units PXU arranged in a matrix form. The pixel units PXU may be disposed on the lower substrate 110. Each of the pixel units PXU may include a first pixel PX1, a second pixel PX2, and a third pixel PX3. The first pixel PX1, the second pixel PX2, and the third pixel PX3 may display different colors in some embodiments. A gray level of each of the first pixel PX1, the second pixel PX2, and the third pixel PX3 can be controlled independently. Each of the first pixel PX1, the second pixel PX2, and the third pixel PX3 may be a basic unit for displaying a determined color. Each of the pixel units PXU may control the transmittance of each of the first pixel PX1, the second pixel PX2, and the third pixel PX3 to realize a color to be displayed by combining respective colors of the first pixel PX1, the second pixel PX2, and the third pixel PX3. Although the pixel units PXU are shown in FIG. 1 as being arranged side by side along a first direction dr1, embodiments are not limited thereto. The pixel units PXU can also be arranged adjacent to each other in other manners. Further, although each of the pixel units PXU are shown in FIG. 1 as including the first pixel PX1, the second pixel PX2, and the third pixel PX3, embodiments are not limited thereto. Each of the pixel units PXU can also be composed of different numbers of pixels.

The lower display panel 100 will, hereinafter, be described.

The lower substrate 110 may be a transparent insulating substrate in some embodiments. Here, the transparent insulating substrate may be a glass substrate, a quartz substrate, a transparent resin substrate, and/or the like.

A first polarizing layer 120 may be disposed under the lower substrate 110. More specifically, the lower substrate 110 may include a surface facing the upper substrate 210 and the other surface opposite the first surface. The first polarizing layer 120 may be disposed on the other surface of the lower substrate 110 in some embodiments. The first polarizing layer 120 may be made of at least one of an organic material and an inorganic material. The first polarizing layer 120 may be a reflective polarizing layer in some embodiments. When the first polarizing layer 120 is a reflective polarizing layer, it may transmit a polarization component parallel to a transmission axis and reflect a polarization component parallel to a reflection axis.

In some embodiments, the first polarizing layer 120 may be disposed on the lower substrate 110. For instance, the first polarizing layer 120 can be disposed between the lower substrate 110 and a first insulating layer 130 to be described later.

A first gate line GL1 and first, second, and third gate electrodes GE1, GE2, and GE3 are disposed on the lower substrate 110. The first gate line GL1 delivers a gate voltage for controlling thin-film transistors, such as first, second, and third thin-film transistors Q1, Q2, and Q3. The first gate line GL1 may extend along the first direction dr1. Here, the first direction dr1 may be a direction indicated by a straight line extending in an arbitrary direction in a plane in which the lower substrate 110 is disposed. The first direction dr1 may be a direction orthogonal to a second direction dr2 which will be described later. The gate voltage may be provided from the outside and may have a varying level. Whether the thin-film transistors are turned on or off may be controlled by the level of the gate voltage.

The first through third gate electrodes GE1 through GE3 may protrude from the first gate line GL1 and may be physically connected to the first gate line GL1, e.g., may physically protrude from the first gate line GL1. The first through third gate electrodes GE1 through GE3 may be one element of first through third thin-film transistors Q1 through Q3 to be described later.

The first gate line GL1 and the first through third gate electrodes GE1 through GE3 may be made of the same material. For example, the first gate line GL1 and the first through third gate electrodes GE1 through GE3 may be made of at least one of an aluminum (Al)-based metal, such as aluminum or an aluminum alloy; a silver (Ag)-based metal, such as silver or a silver alloy; a copper (Cu)-based metal, such as copper or a copper alloy; a molybdenum (Mo)-based metal, such as molybdenum or a molybdenum alloy; chrome (Cr), tantalum (Ta), and titanium (Ti). The first gate line GL1 and the first through third gate electrodes GE1 through GE3 may have a single-layer structure or a multilayer structure including at least two conductive films with different physical properties.

The first insulating layer 130 is disposed on the first gate line GL1 and the first through third gate electrodes GE1 through GE3. The first insulating layer 130 may be made of an insulating material, such as silicon nitride or silicon oxide. The first insulating layer 130 may have a single-layer structure or a multilayer structure including two insulating films with different physical properties.

First, second, and third semiconductor layers SM1, SM2, and SM3 are disposed on the first insulating layer 130. At least part of the first through third semiconductor layers SM1 through SM3 may overlap the first through third gate electrodes GE1 through GE3, respectively. The first through third semiconductor layers SM1 through SM3 may be made of at least one of amorphous silicon, polycrystalline silicon, and an oxide semiconductor. For the purposes or this disclosure, when "two elements overlap each other," it means that a portion of the two elements overlap in a direction perpendicular to the lower substrate 110.

Although not illustrated in the drawings, in some embodiments, ohmic contact members may be additionally disposed adjacent to the first through third semiconductor layers SM1 through SM3 or in some regions of the first through third semiconductor layers SM1 through SM3. The ohmic contact members may be made of n+ hydrogenated amorphous silicon doped with an n-type impurity at a high concentration or may be made of silicide. When the first through third semiconductor layers SM1 through SM3 include an oxide semiconductor, the ohmic contact members may be omitted.

First, second, and third data lines DL1, DL2, and DL3; first, second, and third source electrodes SE1, SE2, and SE3; and first, second, and third drain electrodes DE1, DE2, and DE3 are disposed on the first through third semiconductor layers SM1 through SM3 and the first insulating layer 130.

The first through third data lines DL1 through DL3 may extend along the second direction dr2 and intersect the first gate line GL1. The first through third data lines DL1 through DL3 may be insulated from the first gate line GL1 and the first through third gate electrodes GE1 through GE3 by the first insulating layer 130. The first through third data lines DL1 through DL3 may provide corresponding data voltages to the first through third source electrodes SE1 through SE3, respectively. Here, the data voltages may be provided from the outside and may have varying levels. The gray level of each of the first through third pixels PX1 through PX3 may vary according to the level of a corresponding data voltage.

The first through third source electrodes SE1 through SE3 may branch from the first through third data lines DL1 through DL3, respectively. At least part of the first through third source electrodes SE1 through SE3 may overlap the first through third gate electrodes GE1 through GE3, respectively.

The first through third drain electrodes DE1 through DE3 may, as seen in FIG. 1, respectively be separated (or spaced apart) from the first through third source electrodes SE1 through SE3 with the first through third semiconductor layers SM1 through SM3 disposed between them. At least part of the first through third drain electrodes DE1 through DE3 may overlap the first through third gate electrodes GE1 through GE3, respectively.

As illustrated in FIG. 1, the first through third source electrodes SE1 through SE3 may be "C"-shaped and may respectively surround the first through third drain electrodes DE1 through DE3 with a determined gap between them. However, the shape of the first through third source electrodes SE1 through SE3 is not limited to the "C"-shape and can be changed to various shapes, such as a bar shape.

The first through third data lines DL1 through DL3, the first through third source electrodes SE1 through SE3, and the first through third drain electrodes DE1 through DE3 may be made of the same material. For example, the first through third data lines DL1 through DL3, the first through third source electrodes SE1 through SE3, and the first through third drain electrodes DE1 through DE3 may be made of at least one of aluminum, copper, silver, molybdenum, chromium, titanium, tantalum, and an alloy of these materials. In addition, the first through third data lines DL1 through DL3, the first through third source electrodes SE1 through SE3 and the first through third drain electrodes DE1 through DE3 may have a multilayer structure composed of, for example, a lower layer (not illustrated) made of a refractory metal and an upper layer (not illustrated) made of a material with low resistivity.

The first gate electrode GE1, the first semiconductor layer SM1, the first source electrode SE1, and the first drain electrode DE1 may constitute the first thin-film transistor Q1, which is a switching element. The first thin-film transistor Q1 may be a switching element for controlling the first pixel PX1. The second gate electrode GE2, the second semiconductor layer SM2, the second source electrode SE2, and the second drain electrode DE2 may constitute the second thin-film transistor Q2, which is a switching element.

The second thin-film transistor Q2 may be a switching element for controlling the second pixel PX2. The third gate electrode GE3, the third semiconductor layer SM3, the third source electrode SE3, and the third drain electrode DE3 may constitute the third thin-film transistor Q3, which is a switching element. The third thin-film transistor Q3 may be a switching element for controlling the third pixel PX3.

A passivation layer 140 is disposed on the first insulating layer 130 and the first through third thin-film transistors Q1 through Q3. The passivation layer 140 may be made of an inorganic insulating material and may cover the first through third thin-film transistors Q1 through Q3. The passivation layer 140 protects the first through third thin-film transistors Q1 through Q3 and prevents the material of a second insulating layer 150 from flowing into the first through third semiconductor layers SM1 through SM3.

The second insulating layer 150 is disposed on the passivation layer 140. The second insulating layer 150 may be made of an insulating material. For example, the second insulating layer 150 may be an organic film made of an organic material. The second insulating layer 150 may flatten local steps formed by elements disposed under the second insulating layer 150. In other words, an upper surface of the second insulating layer 150 may be substantially flat.

First, second, and third contact holes CNT1, CNT2, and CNT3 may be formed in the passivation layer 140 and the second insulating layer 150. The first through third contact holes CNT1 through CNT3 may partially expose the first through third thin-film transistors Q1 through Q3; more specifically, may partially expose upper surfaces of the first through third drain electrodes DE1 through DE3 in a direction perpendicular to an upper surface of the lower substrate 110. The first through third contact holes CNT1 through CNT3 may pass through the passivation layer 140 and the second insulating layer 150 in the direction perpendicular to the lower substrate 110. Respective portions of the first through third drain electrodes DE1 through DE3 may be connected to first, second, and third pixel electrodes PE1, PE2, and PE3 disposed on the second insulating layer 150 through the first through third contact holes CNT1 through CNT3, respectively.

In some embodiments, one of the passivation layer 140 and the second insulating to layer 150 may be omitted or replaced with another layer. For example, one layer may perform the functions of the passivation layer 140 and the second insulating layer 150.

The first through third pixel electrodes PE1 through PE3 are disposed on the second insulating layer 150. The first pixel electrode PE1 may be physically connected to the first drain electrode DE1 through the first contact hole CNT1, and may receive a data voltage from the first drain electrode DE1. The second pixel electrode PE2 may be physically connected to the second drain electrode DE2 through the second contact hole CNT2, and may receive a data voltage from the second drain electrode DE2. The third pixel electrode PE3 may be physically connected to the third drain electrode DE3 through the third contact hole CNT3, and may receive a data voltage from the third drain electrode DE3.

The first through third pixel electrodes PE1 through PE3 may be made of at least one transparent conductive material, such as at least one of indium tin oxide (ITO), indium zinc oxide (IZO), indium tin zinc oxide (ITZO), and Al-doped zinc oxide (AZO). It is also contemplated that one or more conductive polymers (ICPs), such as polyaniline (PANI), poly(3,4-ethylenedioxythiophene) poly(styrenesulfonate) (PEDOT:PSS), etc., metal nanowire, and/or graphene may be utilized.

The planar arrangement of the first through third pixel electrodes PE1 through PE3 will, hereinafter, be described. The first pixel electrode PE1 disposed in the first pixel PX1 will be mainly described, and a description of the second pixel electrode PE2 disposed in the second pixel PX2 and the third pixel electrode PE3 disposed in the third pixel PX3 will be omitted because the description of the first pixel PX1 can be applied to the second pixel PX2 and the third pixel PX3.

The first pixel electrode PE1 may have a wider area than a first opening region OP1 and may overlap the first opening region OP1. In other words, the first opening region OP1 may be overlapped by the first pixel electrode PE1. Here, the first opening region OP1 is one of a plurality of openings formed in a light-blocking member BM to be described later and corresponds to an opening disposed in the first pixel PX1. Since the first opening region OP1 can transmit light, a user can see the light provided through the first opening region OP1.

The first pixel electrode PE1 includes a first surface electrode PPE1, a first edge electrode EE1, and a first connecting electrode CE1.

The first surface electrode PPE1 is an element that occupies most of the area of the first pixel electrode PE1 and may be formed in the shape of a surface without an opening. A portion of the first surface electrode PPE1 may be disposed in the first opening region OP1, and the other portion may be disposed in a pixel overlap region OA. Here, the pixel overlap region OA may be a region in which the light-blocking member BM to be described later overlaps each of the first through third pixel electrodes PE1 through PE3. The pixel overlap region OA may be disposed adjacent to at least one side of each of the first through third opening regions OP1 through OP3. The first surface electrode PPE1 may be electrically connected to the first connecting electrode CE1 to receive the data voltage.

The first edge electrode EE1 may be disposed adjacent to at least one side of any one of the first through third opening regions OP1 through OP3 and may be electrically connected to the first surface electrode PPE1 or the first connecting electrode CE1 to receive the data voltage. The first edge electrode EE1 may be disposed along at least one side of any one of the first through third opening regions OP1 through OP3 and another side adjacent to the at least one side. As seen in FIG. 1, the first edge electrode EE1 is disposed adjacent to a left side and a lower side of the first opening region OP1, the lower side being closest to the first gate line GL1.

A transparent conductive material is not disposed between the first edge electrode EE1 and the first surface electrode PPE1. Instead, a first slit pattern SL1 reflecting the shape of the first edge electrode EE1 is disposed between the first edge electrode EE1 and the first surface electrode PPE1.

Outer sides of the first edge electrode EE1 may be disposed adjacent to a side of the first opening region OP1 in a plane. In other words, a boundary line formed by the outer sides of the first edge electrode EE1 may coincide (or substantially coincide) with a boundary line of the first opening region OP1. As seen in FIG. 1, the boundary lines formed by the outer sides of the first, second, and third edge electrodes EE1, EE2, and EE3 are illustrated as substantially coinciding with respective first, second, and third opening regions OP1, OP2, and OP3, which are illustrated via dashed lines simply to distinguish the configuration of first through third opening regions OP1 through OP3 from other structural features illustrated in FIG. 1, and, thereby, not to convey obstruction with other features. Here, the outer sides of the first edge electrode EE1 refer to sides located opposite a direction in which the first surface electrode PPE1 is disposed. As seen in FIG. 1, the outer sides of the first edge electrode EE1 correspond to a left side and a lower side of the first edge electrode EE1.

The first edge electrode EE1 can strengthen the force that tilts the liquid crystal molecules LC toward a determined direction. For example, when the data voltage is applied to the first surface electrode PPE1 and the first edge electrode EE1, the liquid crystal molecules LC tilt in a direction along the direction of an electric field formed by the data voltage. Here, the intensity of the electric field acting toward the center of the first surface electrode PPE1 may be relatively strong on an outer side on which the first edge electrode EE1 is disposed among various outer sides of the first surface electrode PPE1. Accordingly, liquid crystal molecules LC arranged to overlap the first surface electrode PPE1 may tilt in a direction from the first edge electrode EE1 toward the first surface electrode PPE1. Further, liquid crystal molecules LC arranged to overlap the first edge electrode EE1 and the first slit pattern SL1 may also tilt in the direction from the first edge electrode EE1 toward the first surface electrode PPE1.

The direction in which the first edge electrode EE1 is disposed may be determined by the alignment direction of an alignment film 160, which will be described later. That is, the first edge electrode EE1 is disposed in a direction in which the alignment direction of the alignment film 160 begins. With respect to the depiction in FIG. 1, the alignment direction of the alignment film 160 is a direction from a lower-left corner toward an upper-right corner. In this manner, the first edge electrode EE1 is formed adjacent to outer sides, e.g., a left side and a lower side of the first surface electrode PPE1 adjacent to the lower-left corner.

The alignment direction of the alignment film 160 may also be a factor that determines the direction in which the liquid crystal molecules LC tilt. Therefore, when the direction in which the liquid crystal molecules LC are tilted by the alignment direction of the alignment film 160 and the direction in which the liquid crystal molecules LC are tilted by the first edge electrode EE1 are the same, the control of the first pixel electrode PE1 over the liquid crystal molecules LC can be improved, and the response speed of the liquid crystal molecules LC can also be improved.

The first connecting electrode CE1 may be electrically connected to the first drain electrode DE1 through the first contact hole CNT1 and may provide the data voltage received from the first drain electrode DE1 to the first surface electrode PPE1 and the first edge electrode EE1. The first connecting electrode CE1 may not overlap the first opening region OP1.

The above description of the first pixel electrode PE1 can be applied to the second pixel electrode PE2 and the third pixel electrode PE3. That is, the description of the first surface electrode PPE1 can be applied to a second surface electrode PPE2 and a third surface electrode PPE3, and the description of the first edge electrode EE1 can be applied to a second edge electrode EE2 and a third edge electrode EE3. In addition, the description of the first connecting electrode CE1 can be applied to a second connecting electrode CE2 and a third connecting electrode CE3, and the description of the first opening region OP1 can be applied to the second opening region OP2 and the third opening region OP3. Also, the description of the first slit pattern SL1 can be applied to the second slit pattern SL2 and the third slit pattern SL3.

The alignment film 160 is disposed on the first through third pixel electrodes PE1 through PE3.

The alignment film 160 can control the alignment direction and the initial alignment angle (e.g., pre-tilt) of the liquid crystal molecules LC. The alignment film 160 may include an alignment material. The alignment material may be an organic polymer material. The organic polymer material may include at least one of, for example, polyimide, polyamic acid, and polysiloxane. The alignment film 160 may have grooves, which extend along the alignment direction, on its upper surface. Here, the alignment direction refers to a direction in which the liquid crystal molecules LC tilt and may be the same as a direction in which the alignment material coated at the time of manufacturing the alignment film 160 is scraped off through a rubbing process. As previously mentioned, the alignment direction is the direction from the lower-left corner toward the upper-right corner based on the depiction in FIG. 1.

Next, the upper display panel 200 will be described.

The upper substrate 210 may be placed to face the lower substrate 110. The upper substrate 210 may be made of transparent glass or plastic. In some embodiments, the upper substrate 210 may be made of the same material as the lower substrate 110.

A first filter 220 and a first transmissive layer 241 are disposed on a surface of the upper substrate 210 which faces the lower substrate 110. The first filter 220 may overlap a first wavelength conversion layer WC1, a second wavelength conversion layer WC2, and a second transmissive layer 242, each of which will be described later.

The first filter 220 may block light having a first wavelength region and transmit light having a second wavelength region and light having a third wavelength region. The first filter 220 will be described in more detail based on the first wavelength conversion layer WC1. Light having the first wavelength region provided to the first wavelength conversion layer WC1 is converted into light having the second wavelength region by a first wavelength conversion material WC1a. However, some of the light having the first wavelength region provided to the first wavelength conversion layer WC1 may not meet (e.g., be incident with) the first wavelength conversion material WC1a. In this case, the light of the first wavelength region and the light of the second wavelength region into which the light having the first wavelength region provided to the first wavelength conversion layer WC1 has been converted by the first wavelength conversion material WC1a may be mixed with each other. Here, the first filter 220 may block the light that still has the first wavelength region even if the light has passed through the first wavelength conversion layer WC1, thereby preventing color mixing and improving color purity.

The first through third wavelength regions may be different from each other. A center wavelength of the first wavelength region may be about 420 nm to about 480 nm in some embodiments. Accordingly, light having the first wavelength region may be blue light. A center wavelength of the second wavelength region may be about 600 nm to about 670 nm in some embodiments. Accordingly, light having the second wavelength region may be red light. A center wavelength of the third wavelength region may be about 500 nm to about 570 nm in some embodiments. Accordingly, light having the third wavelength region may be green light.

Hereinafter, light having the first wavelength region will be described as blue light, light having the second wavelength region as red light, and light having the third wavelength region as green light. Therefore, the first filter 220 may block blue light and transmit is red light and green light. That is, the first filter 220 may be a blue cut-off filter in some embodiments. The first filter 220 may be formed as a single layer or from multiple layers.

The first transmissive layer 241 may overlap the third pixel PX3. The first transmissive layer 241 may include a third light-transmitting resin 240b and a light-scattering material 240a.

The light-scattering material 240a may be dispersed in the third light-transmitting resin 240b to scatter light provided to the first transmissive layer 241 and to emit the scattered light to the outside. Here, the emitted light may be scattered in various directions regardless of an incident angle and may be depolarized to become unpolarized light. For the purposes of this disclosure, "unpolarized light" refers to light that is not composed only of polarization components in a specific direction; that is, light that is not polarized only in a specific direction; in other words, light that is composed of random polarization components. An example of the unpolarized light is natural light.

A color conversion layer 230 is disposed on a surface of the first filter 220 that faces the lower substrate 110. The color conversion layer 230 may include the first wavelength conversion layer WC1 and the second wavelength conversion layer WC2.

The first wavelength conversion layer WC1 may overlap the first pixel PX1. The first wavelength conversion layer WC1 may include a first light-transmitting resin WC1b and the first wavelength conversion material WC1a, in some embodiments.

The first wavelength conversion material WC1a may be dispersed in the first light-transmitting resin WC1b to convert or shift light provided to the first wavelength conversion layer WC1 into light having the second wavelength region. The light provided to the first wavelength conversion layer WC1 may be light having the first wavelength region, that is, blue light. Accordingly, the first wavelength conversion layer WC1 may receive blue light from the outside (e.g., form a light source, such as a backlight) and convert the received blue light into red light. The first wavelength converting material WC1a may include first quantum dots in some embodiments. The particle size of the first quantum dots is not limited as long as the first wavelength converting material WC1a can convert light received from the outside into light of the second wavelength region. The first wavelength conversion material WC1a may be dispersed in a naturally coordinated form in the first light-transmitting resin WC1b.

The first light-transmitting resin WC1b is not limited as long as it is a transparent medium that does not affect the wavelength conversion performance of the first wavelength conversion material WC1a, and does not cause light absorption. For example, the first light-transmitting resin WC1b may include at least one of epoxy, polystyrene, and acrylate. The first wavelength conversion layer WC1 can include an organic solvent instead of the first light-transmitting resin WC1b. The organic solvent may include at least one of toluene, chloroform, and ethanol, in some embodiments.

The second wavelength conversion layer WC2 may overlap the second pixel PX2. The second wavelength conversion layer WC2 may include a second light-transmitting resin WC2b and a second wavelength conversion material WC2a, in some embodiments.

The second wavelength conversion material WC2a may be dispersed in the second light-transmitting resin WC2b to convert or shift light provided to the second wavelength conversion layer WC2 into light having the third wavelength region. The light provided to the second wavelength conversion layer WC2 may be blue light. Accordingly, the second wavelength conversion layer WC2 may receive blue light from the outside and convert the received blue light into green light. The second wavelength conversion material WC2a may include second quantum dots, in some embodiments. The particle size of the second quantum dots is not limited as long as the second wavelength conversion material WC2a can convert light received from the outside into light of the third wavelength region. The average particle size of the second wavelength conversion material WC2a may be smaller than that of the first wavelength conversion material WC1a. The second wavelength conversion material WC2a may 2o be dispersed in a naturally coordinated form in the second light-transmitting resin WC2b.

The second light-transmitting resin WC2b is not limited as long as it is a transparent medium that does not affect the wavelength conversion performance of the second wavelength conversion material WC2a and does not cause light absorption. For example, the second light-transmitting resin WC2b may include at least one of epoxy, polystyrene, and acrylate. The second wavelength conversion layer WC2 can include an organic solvent instead of the second light-transmitting resin WC2b. The organic solvent may include at least one of toluene, chloroform, and ethanol, in some embodiments.

The first quantum dots and the second quantum dots may be selected from at least one of a group II-VI compound, a group III-V compound, a group IV-VI compound, a group IV element, a group IV compound, and combinations of these materials.

The group II-VI compound may be selected from a binary compound selected from at least one of CdSe, CdTe, ZnS, ZnSe, ZnTe, ZnO, HgS, HgSe, HgTe, MgSe, MgS, and mixtures of these materials; a ternary compound selected from at least one of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixtures of these materials; and a quaternary compound selected from at least one of HgZnTeS, CdZnSeS, CdZnSeTe, CdZnSTe, CdHgSeS, CdHgSeTe, CdHgSTe, HgZnSeS, HgZnSeTe, HgZnSTe, and mixtures of these materials.

The group III-V compound may be selected from a binary compound selected from at least one of GaN, GaP, GaAs, GaSb, AlN, AlP, AlAs, AlSb, InN, InP, InAs, InSb, and mixtures of these materials; a ternary compound selected from at least one of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and mixtures of these materials; and a quaternary compound selected from at least one of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and mixtures of these materials.

The group IV-VI compound may be selected from a binary compound selected from at least one of SnS, SnSe, SnTe, PbS, PbSe, PbTe, and mixtures of these materials; a ternary compound selected from at least one of SnSeS, SnSeTe, SnSTe, PbSeS, PbSeTe, PbSTe, SnPbS, SnPbSe, SnPbTe, and mixtures of these materials; and a quaternary compound selected from at least one of SnPbSSe, SnPbSeTe, SnPbSTe, and mixtures of these materials. The group IV element may be selected from at least one of Si, Ge, and a mixture of these materials. The group IV compound may be a binary compound selected from at least one of SiC, SiGe, and a mixture of these materials.

According to some embodiments, the binary compound, the ternary compound, or the quaternary compound may be present in a particle at a uniform concentration or may be present in the same particle at non-uniform concentrations. In addition, the binary compound, the ternary compound, or the quaternary compound may have a core/shell structure in which one quantum dot surrounds another quantum dot. The interface between the core and the shell may have a concentration gradient in which the concentration of an element existing in the shell becomes lower toward the center.

The first and second quantum dots may have a full width of half maximum (FWHM) of an emission wavelength spectrum of about 45 nm or less, such as about 40 nm or less, e.g., about 30 nm or less. In this range, the first and second quantum dots can improve color purity and/or color reproducibility. In addition, since light emitted through the first quantum dots and the second quantum dots is radiated in all directions, a wide viewing angle can be improved. Each of the first and second quantum dots may be in the form of a spherical, pyramidal, multi-arm, or cubic nanoparticle, nanotube, nanowire, nanofiber, plate-like nanoparticle, or the like.

In some embodiments, the first wavelength conversion material WC1a and the second wavelength conversion material WC2a may include a phosphor, a quantum rod, or a phosphor material, instead of quantum dots. Here, the phosphor may have a size of about 100 nm to about 3000 nm, in some embodiments. In addition, the phosphor may include at least one of yellow, green, and red fluorescent materials.

That is, each of the first and second wavelength conversion materials WC1a and WC2a may absorb light provided to the first wavelength conversion layer WC1 or the second wavelength conversion layer WC2, and emit light having a center wavelength different from that of the absorbed light. More specifically, the first and second wavelength conversion materials WC1a and WC2a may respectively scatter light incident on the first wavelength conversion layer 10o WC1 and the second wavelength conversion layer WC2 in various directions regardless of the incident angle. That is, the display device according to various exemplary embodiments can improve the wide viewing angle by emitting light in various directions through the first and second wavelength conversion materials WC1a and WC2a.

Light emitted from the first wavelength conversion layer WC1 and the second wavelength conversion layer WC2 may be in an unpolarized state through depolarization.

A second filter 250 is disposed on surfaces of the first wavelength conversion layer WC1, the second wavelength conversion layer WC2, and the first transmissive layer 241, each of which face the lower substrate 110. The second filter 250 may transmit light having the first wavelength region and reflect light having the second wavelength region and light having the third wavelength region, in some embodiments. That is, the second filter 250 may transmit blue light and reflect red light and green light. Accordingly, the second filter 250 can improve the output efficiency of light emitted to the outside from the first wavelength conversion layer WC1 or the second wavelength conversion layer WC2. The second filter 250 may surround the first wavelength conversion layer WC1, the second wavelength conversion layer WC2, and the second transmissive layer 242, in some embodiments.

For example, a region of the second filter 250 that surrounds the first wavelength conversion layer WC1 may transmit blue light and provide the blue light to the first wavelength conversion layer WC1. The blue light provided to the first wavelength conversion layer WC1 is converted into red light by the first wavelength conversion material WC1a and is emitted toward the upper substrate 210, that is, to the outside. Of the red light, light proceeding toward the lower substrate 110 rather than toward the upper substrate 210 may be reflected by the region of the second filter 250, which surrounds the first wavelength conversion layer WC1.

The second filter 250 may be formed as a single layer or from multiple layers. When formed from multiple layers, the second filter 250 may include a layer containing $SiN_x$ and a layer containing $SiO_x$. In some embodiments, the layer containing $SiN_x$ and the layer containing $SiO_x$ may be alternately and repeatedly stacked.

Since the display device, according to some embodiments, includes the first filter 220 and the second filter 250, the display device can prevent color mixing. In addition, the display device, according to some embodiments, can improve color reproducibility by improving the output efficiency of light emitted to the outside from the first wavelength conversion layer WC1 and/or the second wavelength conversion layer WC2.

The second transmissive layer 242 is disposed on a surface of the second filter 250 that faces the lower substrate 110. The second transmissive layer 242 may be disposed between the first wavelength conversion layer WC1 and the second wavelength conversion layer WC2, and between the second wavelength conversion layer WC2 and the first transmissive layer 241. The second transmissive layer 242 may be made of the same material as the first transmissive layer 241.

A planarization layer 260 is disposed on a surface of the second transmissive layer 242 that faces the lower substrate 110. The planarization layer 260 may be made of an organic material in some embodiments. When the first wavelength conversion layer WC1, the second wavelength conversion layer WC2, and the first transmissive layer 241 have different thicknesses, the planarization layer 260 may provide a flat (or substantially flat) surface so that elements formed on the surface of the planarization layer 260 can have a uniform height from the surface of the upper substrate 210, such as the wire gird patterns 281 that will be described later.

A third insulating layer 270 is disposed on a surface of the planarization layer 260 that faces the lower substrate 110. The third insulating layer 270 may be made of an inorganic insulating material, such as silicon nitride or silicon oxide, in some embodiments. The third insulating layer 270 can be omitted.

A second polarizing layer 280 is disposed on a surface of the third insulating layer 270 that faces the lower substrate 110. In some embodiments, the second polarizing layer 280 may include a conductive material through which a current can flow. The conductive material may include a metal, such as at least one of aluminum (Al), silver (Ag), gold (Au), copper (Cu), and nickel (Ni), in some embodiments. In addition, the conductive material may further include at least one of titanium (Ti) and molybdenum (Mo).

The second polarizing layer 280 may be a wire grid polarizer in some embodiments. Accordingly, the second polarizing layer 280 may include a plurality of wire grid patterns 281 protruding toward the lower substrate 110. The second polarizing layer 280 may include at least one of aluminum, silver, copper, and nickel in some embodiments.

For example, when light provided to the second polarizing layer 280 passes through the second polarizing layer 280, a component parallel to the second polarizing layer 280 may be absorbed or reflected, and only a component perpendicular to the second polarizing layer 280 may be transmitted to become polarized light. Here, the larger the interval between the wire grid patterns 281 of the second polarizing layer 280, the more efficient polarization can be achieved. The second polarizing layer 280 may be formed by a method, such as nanoimprinting, in some embodiments.

The second polarizing layer 280 may further include a capping layer 282. The capping layer 282 can suppress defects, such as corrosion, of the second polarizing layer 280 and flatten an upper surface of the second polarizing layer 280.

A common electrode CE is disposed on the surface of the second polarizing layer 280 that faces the lower substrate 110. At least part of the common electrode CE may overlap the first through third pixel electrodes PE1 through PE3. The common electrode CE may be in the form of a whole plate, in some embodiments. The common electrode CE may be made of a transparent conductive material, such as at least one of ITO and IZO, or a reflective metal, such as at least one of aluminum, silver, chromium, and an alloy of these metals.

The light-blocking member BM is disposed on a surface of the common electrode CE that faces the lower substrate 110. The light-blocking member BM includes the first through third opening regions OP1 through OP3, and may block the transmission of light through regions other than the first through third opening regions OP1 through OP3. The light-blocking member BM may be made of a material that blocks light. The light-blocking member BM may be made of an organic material or a metallic material, such as chromium.

The light-blocking member BM may be formed on the surface of the common electrode CE and may have a cross-sectional structure protruding toward the liquid crystal layer 300. In addition, the light-blocking member BM may partially overlap the first through third pixel electrodes PE1 through PE3. As described above, a region in which the light-blocking member BM overlaps each of the first through third pixel electrodes PE1 through PE3 is defined as the pixel overlap region OA. Of the regions where the light-blocking member BM is disposed, regions other than the first through third opening regions OP1 through OP3 and the pixel overlap regions OA are defined as non-overlap regions NPA.

In other words, a region in which the first through third pixels PX1 through PX3 are disposed can be divided into first through third openings OP1 through OP3, the pixel overlap regions OA, and the non-overlap regions NPA based on the light-blocking member BM. In some embodiments, however, the light-blocking member BM may further include openings in regions other than the region in which the light-blocking member BM overlaps each of the first through third pixel electrodes PE1 through PE3. For example, the light-blocking member BM may further include openings in regions where the first through third thin-film transistors Q1 through Q3 are disposed.

Since the light-blocking member BM has a cross-sectional structure protruding toward the liquid crystal layer 300, it can fix the arrangement of liquid crystal molecules LC disposed adjacent to side walls of the light-blocking member BM, thereby improving transmittance. This will now be described in more detail with reference to FIG. 3.

Figure 3:
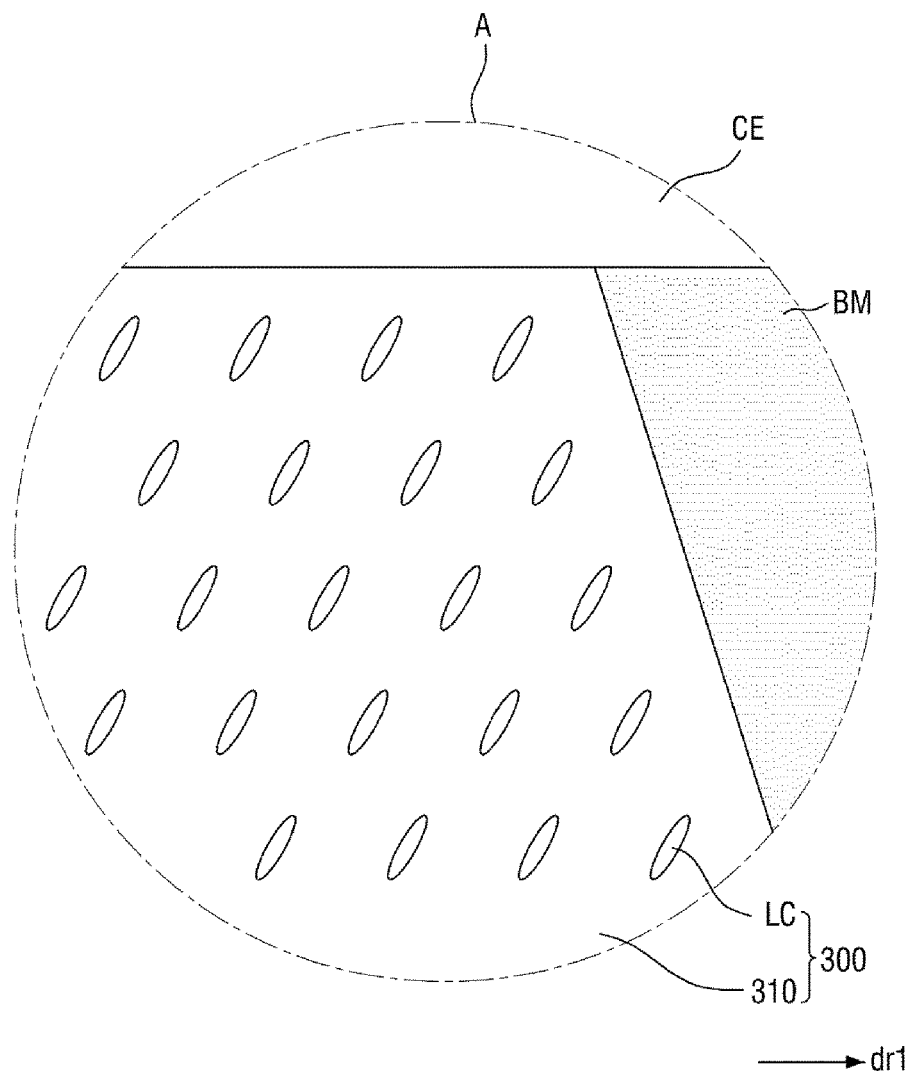
FIG. 3 is an enlarged view of a region A in FIG. 2 according to some exemplary embodiments.

FIG. 3 is an enlarged view of a region A in FIG. 2 according to some exemplary embodiments.

Referring to FIG. 3, the light-blocking member BM may provide the liquid crystal layer 300 with side walls having an inverted sloping and dam-shaped step such that the light-blocking member BM protrudes into a region 310 of the liquid crystal layer 300. In other words, the light-blocking member BM includes side walls having an inverted slope with respect to the surface of the lower substrate 110 that faces the upper substrate 210. The liquid crystal molecules LC may be subjected to a force to tilt toward the first direction dr1 by the inverted sloping side walls of the light-blocking member BM. Accordingly, the liquid crystal molecules LC may all be tilted in one direction even in the vicinity of the region where the light-blocking member BM is disposed. Thus, the liquid crystal molecules LC may not collide with each other, thereby improving transmittance. As such, dark portions formed by the collision of the liquid crystal molecules LC may not be seen in a boundary region of the light-blocking member BM.

Referring again to FIGS. 1 and 2, the light-blocking member BM forms a step in the liquid crystal layer 300 at the boundary line of each of the first through third opening regions OP1 through OP3, as described above with reference to FIG. 3. The step of the light-blocking member BM may provide the liquid crystal molecules LC with a force acting toward the outside of the first through third opening regions OP1 through OP3. In particular, at the boundary lines of the first through third opening regions OP1 through OP3 where the first through third edge electrodes EE1 through EE3 are not disposed, the direction of the force may coincide with the alignment direction of the liquid crystal molecules LC. Therefore, the formation of dark portions can be further minimized. According to various embodiments, the formation of dark portions at the right and upper boundary lines of the first through third opening regions OP1 through OP3 can be minimized or at least reduced.

However, there may still be a possibility that dark portions are visible at the boundary lines of the first through third opening regions OP1 through OP3 due to the collision of tilting directions of the liquid crystal molecules LC. In order to minimize or reduce this possibility, the first through third surface electrodes PPE1 through PPE3 may partially overlap the light-blocking member BM to form the pixel overlap regions OA. In other words, the first through third surface electrodes PPE1 through PPE3 may intentionally be extended to regions other than the first through third opening regions OP1 through OP3 in order to overlap the light-blocking member BM. This will be described in more detail with reference to FIG. 4.

Figure 4:
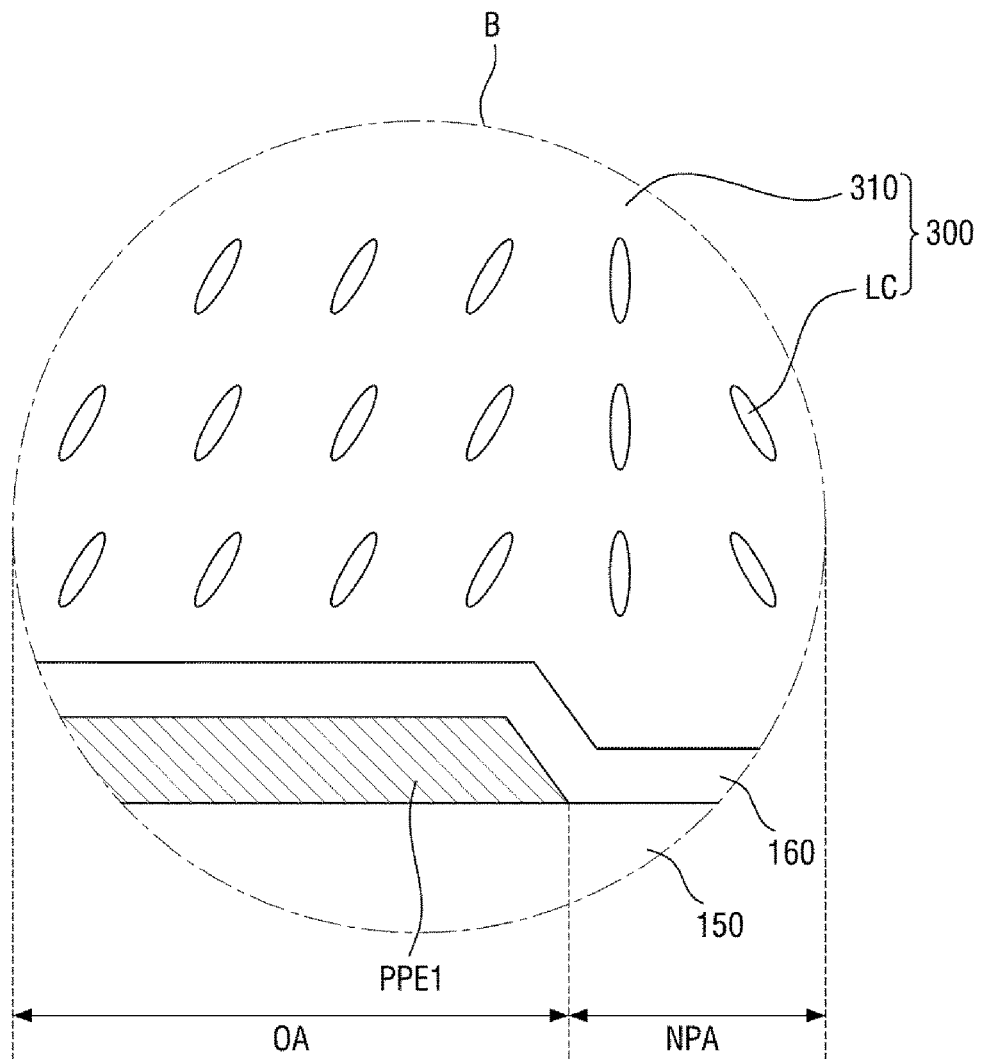
FIG. 4 is an enlarged cross-sectional view of a region B in FIG. 2 according to some exemplary embodiments.

FIG. 4 is an enlarged view of a region B in FIG. 2 according to some exemplary embodiments.

Referring to FIG. 4, liquid crystal molecules LC overlapping an outer boundary of the first surface electrode PPE1 may be vertically controlled without being tilted in a specific direction. This is because liquid crystal molecules LC tilted toward the first surface electrode PPE1 by the first surface electrode PPE1 collide with liquid crystal molecules LC tilted by the alignment film 160, the first edge electrode EE1, and the light-blocking member BM. However, even if the liquid crystal molecules LC collide with each other, if the outer boundary of the first surface electrode PPE1 is placed to overlap the light-blocking member BM to form the pixel overlap region OA, it is possible to minimize a phenomenon in which a dark portion due to the collision of the liquid crystals LC and the light-blocking member BM are visible to a user in an overlapping manner. Thus, transmittance can be improved.

The liquid crystal layer 300 will now be described in more detail with reference to FIGS. 1 and 2.

The liquid crystal layer 300 includes a plurality of liquid crystal molecules LC in a region 310. The liquid crystal molecules LC may have negative dielectric anisotropy in some embodiments. In this case, the liquid crystal molecules LC may be arranged in the direction perpendicular to the lower substrate 110 when no electric field is formed in the liquid crystal layer 300. When the electric field is formed between the lower substrate 110 and the upper substrate 210, the liquid crystal molecules LC may rotate or tilt in a determined direction to change the polarization of light provided to the liquid crystal layer 300. However, in some embodiments, the liquid crystal molecules LC can have positive dielectric anisotropy.

Figure 5:
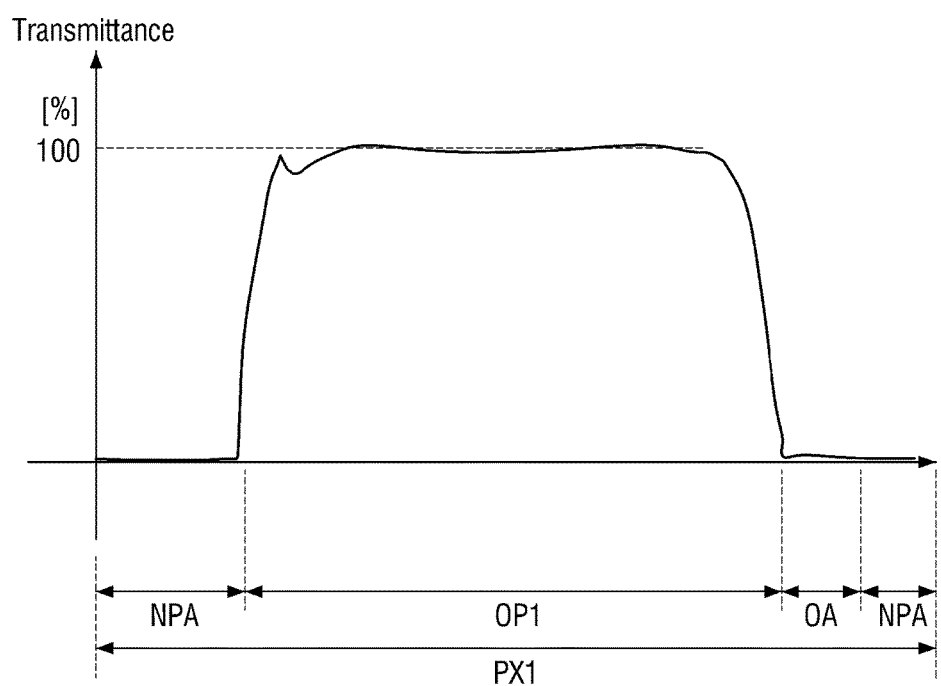
FIG. 5 is a graph illustrating the transmittance at each position in a first pixel according to some exemplary embodiments.

FIG. 5 is a graph illustrating the transmittance at each position in the first pixel PX1 according to some exemplary embodiments.

In FIG. 5, the transmittance at each position in the first pixel PX1 according to various embodiments of FIG. 1 is illustrated. The transmittance was measured along the first direction dr1 across the first opening region OP1 in the view of FIG. 1. The x-axis of the graph represents the position in the first pixel PX1, and the y-axis of the graph represents the transmittance. The transmittance is 100% at a position having maximum transmittance, and the unit is %. As seen in FIG. 5, in a region where the first pixel PX1 is disposed, the transmittance of the non-overlap region NPA and the pixel overlap region OA is (or is substantially) 0%. In other words, since the non-overlap region NPA and the pixel overlap region OA are shielded from light by the light-blocking member BM, the transmittance may be 0%.

The overall transmittance of the first opening region OP1 is uniformly maintained close to 100%. That is, a dark portion having a transmittance of below 50% may not be visible in the first opening region OP1. Even if the liquid crystal molecules LC actually collide with each other to form a dark portion, such a collision is induced to occur at the boundary line between the pixel overlap region OA and the non-overlap region NPA. Therefore, no dark portion may be visible in the first opening region OP1.

Figure 6:
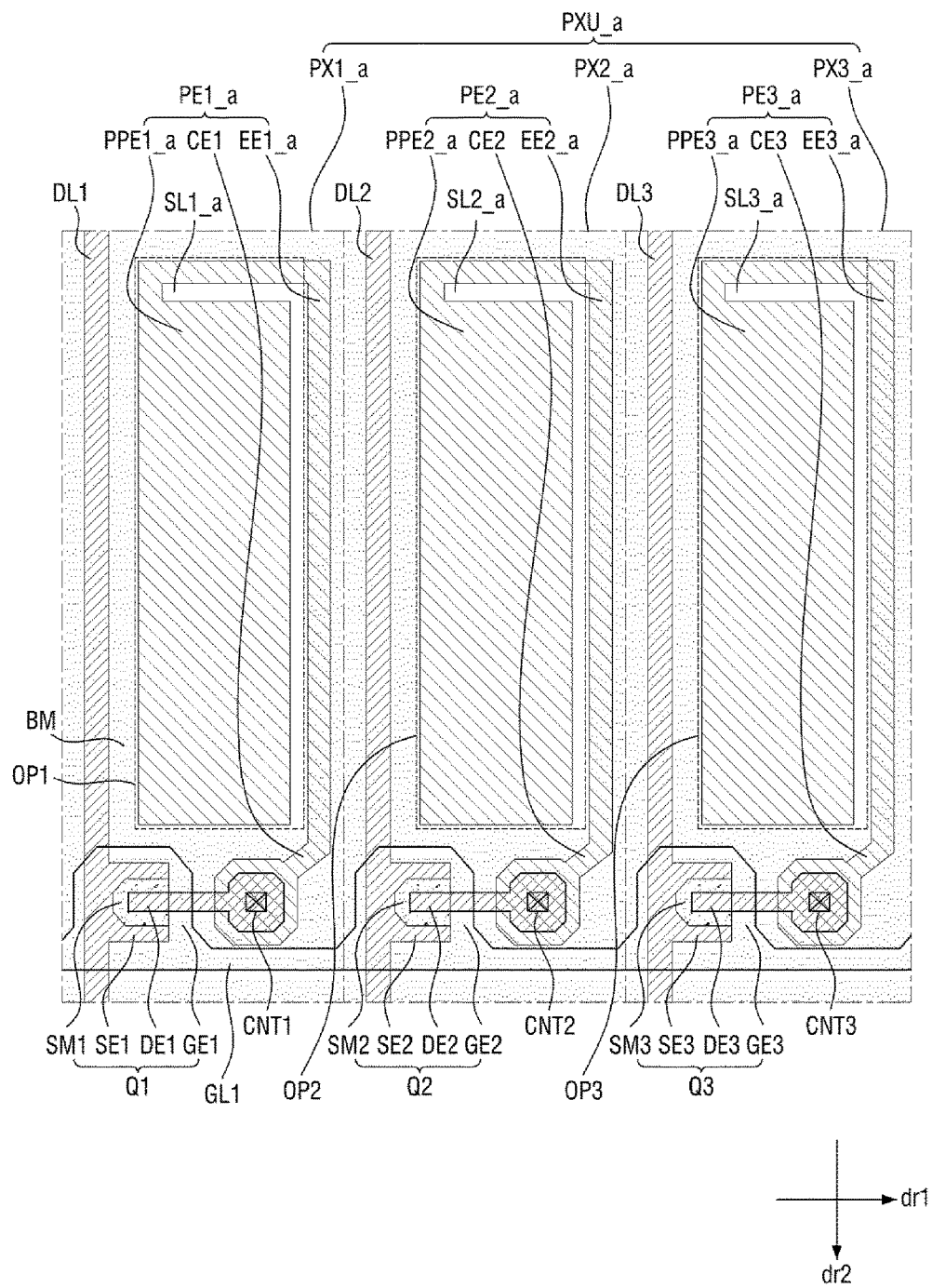
FIG. 6 is a layout view of a pixel unit according to some exemplary embodiments.

FIG. 6 is a layout view of a pixel unit PXU_a according to some exemplary embodiments. In FIG. 6, a description of elements and reference numerals identical or similar to those described above with reference to FIGS. 1 through 5 will be omitted, and primarily differences will be described below.

Referring to FIG. 6, the pixel unit PXU_a includes first, second, and third pixels PX1_a, PX2_a, and PX3_a. The first through third pixels PX1_a through PX3_a include first, second, and third pixel electrodes PE1_a, PE2_a, and PE3_a, respectively. The first through third pixel electrodes PE1_a through PE3_a include first, second, and third surface electrodes PPE1_a, PPE2_a, and PPE3_a; first, second, and third edge electrodes EE1_a, EE2_b, and EE3_a; first, second, and third connecting electrodes CE1_a, CE2_a, and CE3_a; and first, second, and third slit patterns SL1_a, SL2_a, and SL3_a, respectively.

Hereinafter, the structure of the first pixel electrode PE1_a will be mainly described as representative. In other words, the description of the first pixel electrode PE1_a may be applied to the second pixel electrode PE2_a and the third pixel electrode PE3_a.

As seen in FIG. 6, the first pixel electrode PE1_a includes the first surface electrode PPE1_a disposed at a lower-left corner, the first edge electrode EE1_a disposed at an upper-right corner, and the first connecting electrode CE1_a electrically connected to the first surface electrode PPE1_a and the first edge electrode EE1_a. The first slit pattern SL1_a separates the first edge electrode EE1_a from a portion of the first surface electrode PPE1_a. In this manner, the position of the first edge electrode EE1_a and the first slit pattern SL1_a may be opposite to that of their counterparts shown in FIG. 1. Accordingly, the alignment direction of the first pixel PX1_a may also be opposite. That is, the alignment direction may be in a direction from the upper-right corner toward the lower-left corner in the view of FIG. 6.

As described above, the position of the first edge electrode EE1_a and the first slit pattern SL1_a can be changed according to the alignment direction in various embodiments.

Figure 7:
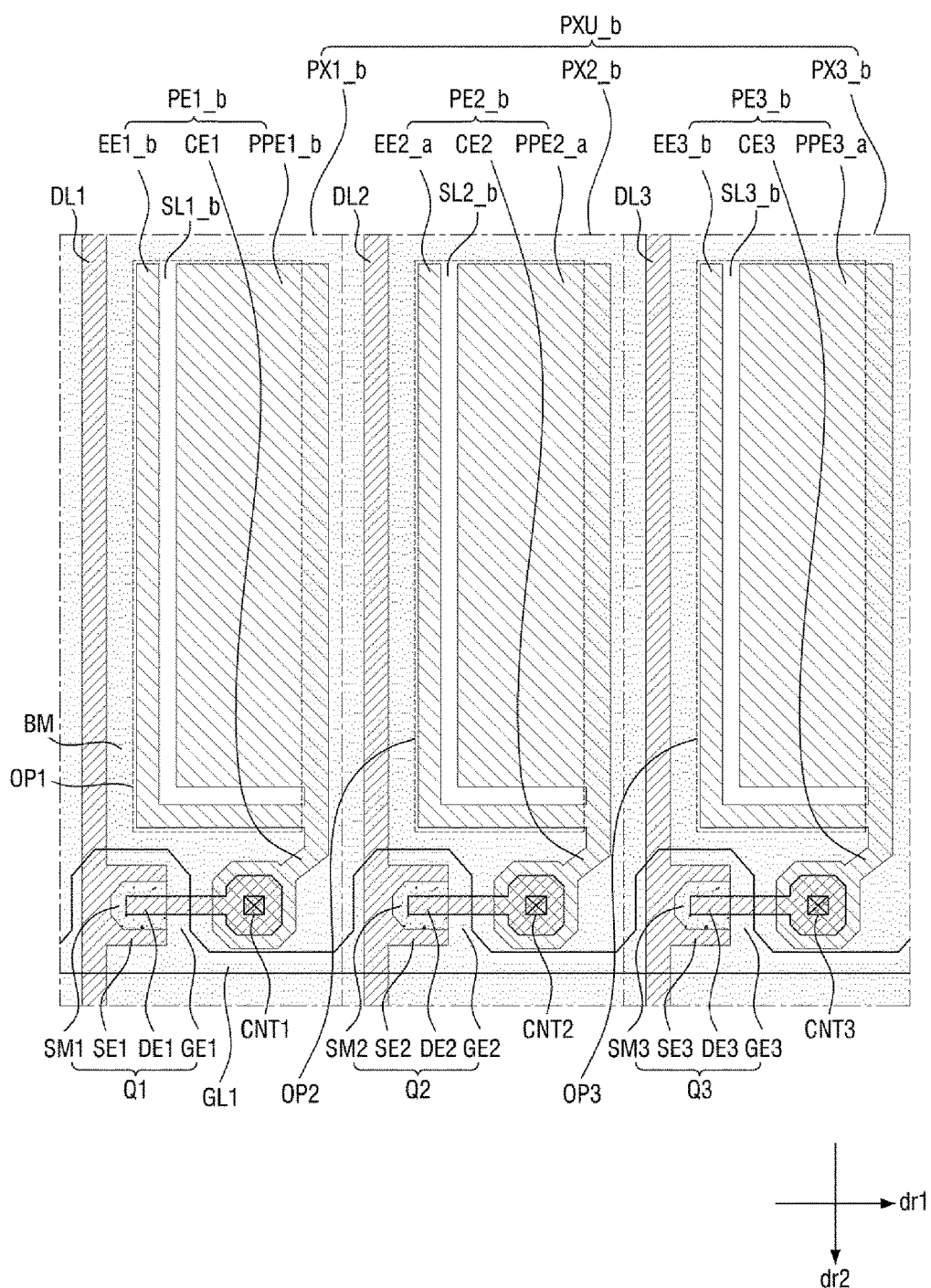
FIG. 7 is a layout view of a pixel unit according to some exemplary embodiments.

FIG. 7 is a layout view of a pixel unit PXU_b according to some exemplary embodiments. In FIG. 7, a description of elements and reference numerals identical or similar to those described above with reference to FIGS. 1 through 5 will be omitted, and primarily differences will be described below.

Referring to FIG. 7, the pixel unit PXU_b includes first, second, and third pixels PX1_b, PX2_b, and PX3_b. The first through third pixels PX1_b through PX3_b include first, second, and third pixel electrodes PE1_b, PE2_b, and PE3_b, respectively. The first through third pixel electrodes PE1_b through PE3_b include first, second, and third surface electrodes PPE1_b, PPE2_b, and PPE3_b; first, second, and third edge electrodes EE1_b, EE2_b, and EE3_b; first, second, and third connecting electrodes CE1, CE2, and CE3; and first, second, and third slit patterns SL1_b, SL2_b, and SL3_b, respectively.

Hereinafter, the structure of the first pixel electrode PE1_b will be mainly described as representative. That is, the description of the first pixel electrode PE1_b may be applied to the second pixel electrode PE2_b and the third pixel electrode PE3_b.

As seen in FIG. 7, the first pixel electrode PE1_b includes the first edge electrode EE1_b disposed at a lower-left corner, the first surface electrode PPE1_b disposed at an upper-right corner, and the first connecting electrode CE1 electrically connected to the first edge electrode EE1_b and the first surface electrode PPE1_b. The first slit pattern SL1_b separates the first edge electrode EE1_b from a portion of the first surface electrode PPE1_b.

The first edge electrode EE1_b may be disposed adjacent to a first opening region OP1 and may overlap a light-blocking member BM. In other words, the first edge electrode EE1_b may be disposed along an outer boundary of the first opening region OP1. In this case, since the first edge electrode EE1_b is disposed outside the first opening region OP1, a force generated by the first edge electrode EE1_b to orient liquid crystal molecules LC toward the center of the first opening region OP1 can act on the liquid crystal molecules LC over a more sufficient (or larger) area. Consequently, the force that orients the liquid crystal molecules LC overlapping the first opening region OP1 toward the upper-right corner in the view of FIG. 7 becomes stronger, thus improving the control over the liquid crystal molecules LC of the first pixel PX1_b. Accordingly, this can improve response speed and increase transmittance.

Figure 8:
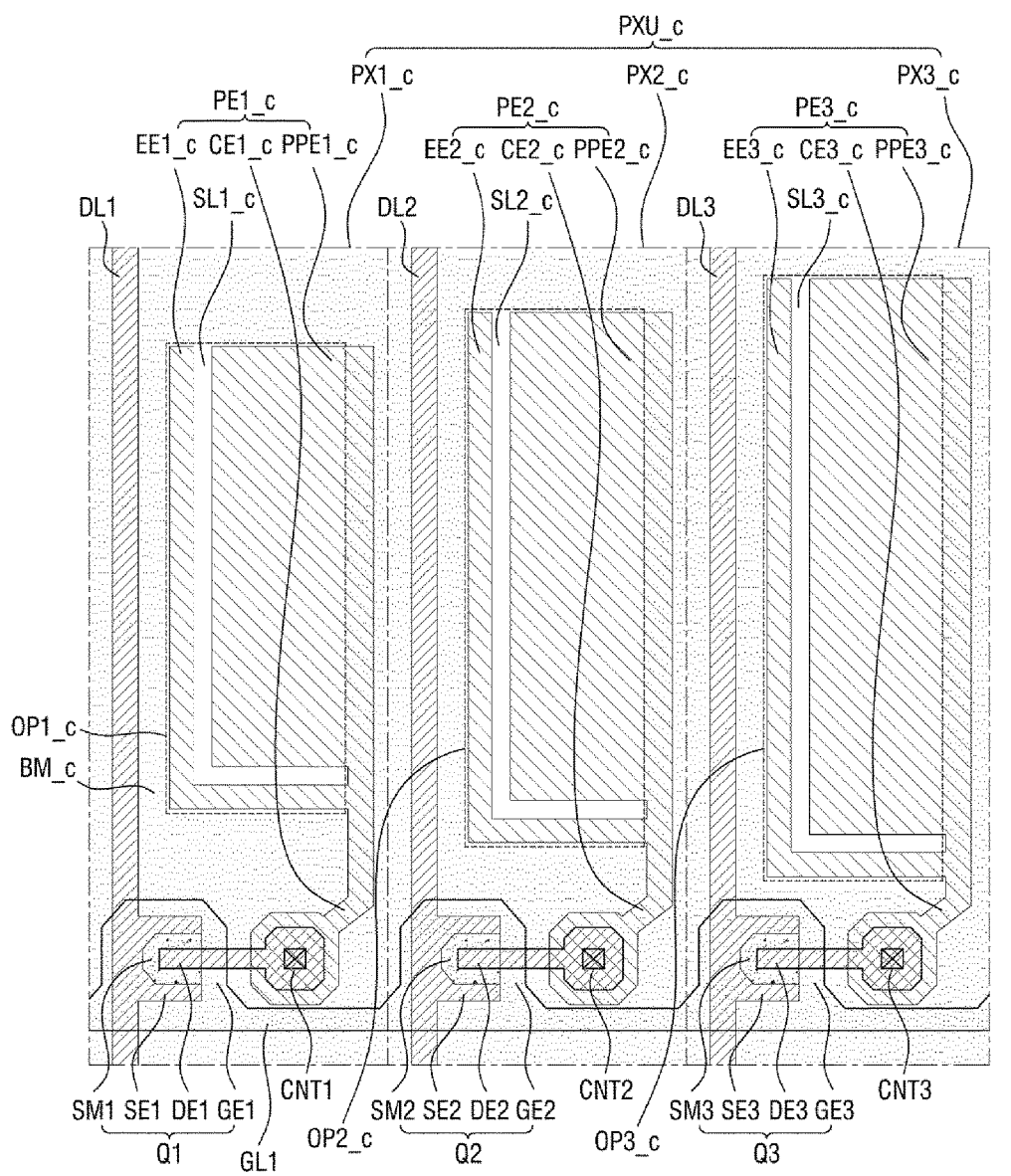
FIG. 8 is a layout view of a pixel unit according to some exemplary embodiments.

FIG. 8 is a layout view of a pixel unit PXU_c according to some exemplary embodiments. In FIG. 8, a description of elements and reference numerals identical or similar to those described above with reference to FIGS. 1 through 5 will be omitted, and primarily differences will be described below.

Referring to FIG. 8, the pixel unit PXU_c includes first, second, and third pixels PX1_c, PX2_c, and PX3_c. The first through third pixels PX1_c through PX3_c include first, second, and third pixel electrodes PE1_c, PE2_c, and PE3_c, respectively. The first through third pixel electrodes PE1_c through PE3_c include first, second, and third surface electrodes PPE1_c, PPE2_c, and PPE3_c; first, second, and third edge electrodes EE1_c, EE2_c, and EE3_c, first, second, and third connecting electrodes CE1_c through CE3_c; and first, second, and third slit patterns SL1_c, SL2_c, and SL3_c, respectively.

In addition, first, second, and third opening regions OP1_c, OP2_c, and OP3_c are formed overlapping the first through third pixels PX1_c through PX3_c, respectively. Here, the third opening region OP3_c may have a larger area than the second opening region OP2_c, and the second opening region OP2_c may have a larger area than the first opening region OP1_c. That is, the sizes of the first through third opening regions OP1_c through OP3_c formed in a light-blocking member BM_c may be different from those of their counterparts shown in FIGS. 1 through 5. Accordingly, the third pixel electrode PE3_c may be larger than the second pixel electrode PE2_c, and the second pixel electrode PE2_c may be larger than the first pixel electrode PE1_c. In addition, the third slit pattern SL3_c may be larger than the second slit pattern SL2_c, and the second slit pattern SL2_c may be larger than the first slit pattern SL1_c.

Figure 9:
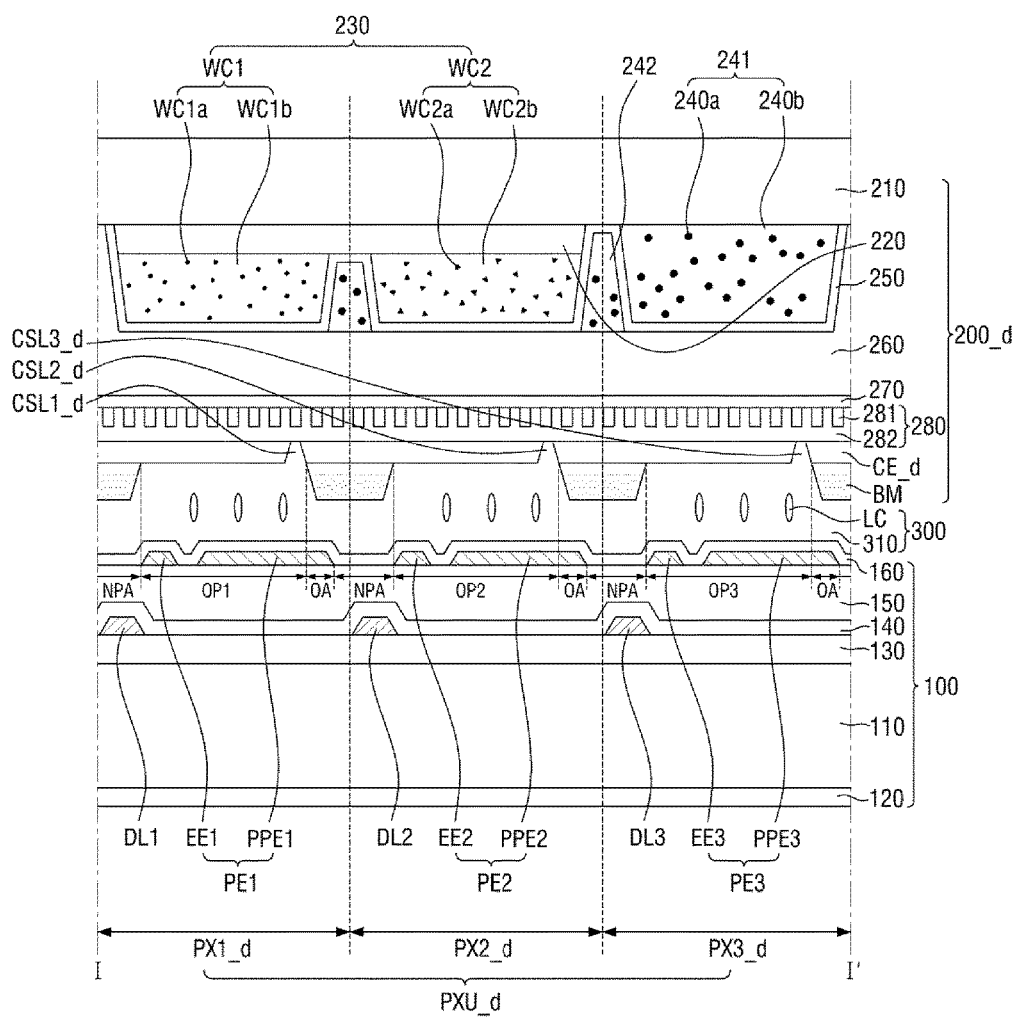
FIG. 9 is a cross-sectional view of a pixel unit taken along a sectional line corresponding to the sectional line I-I' of FIG. 1 according to some exemplary embodiments.
Figure 10:
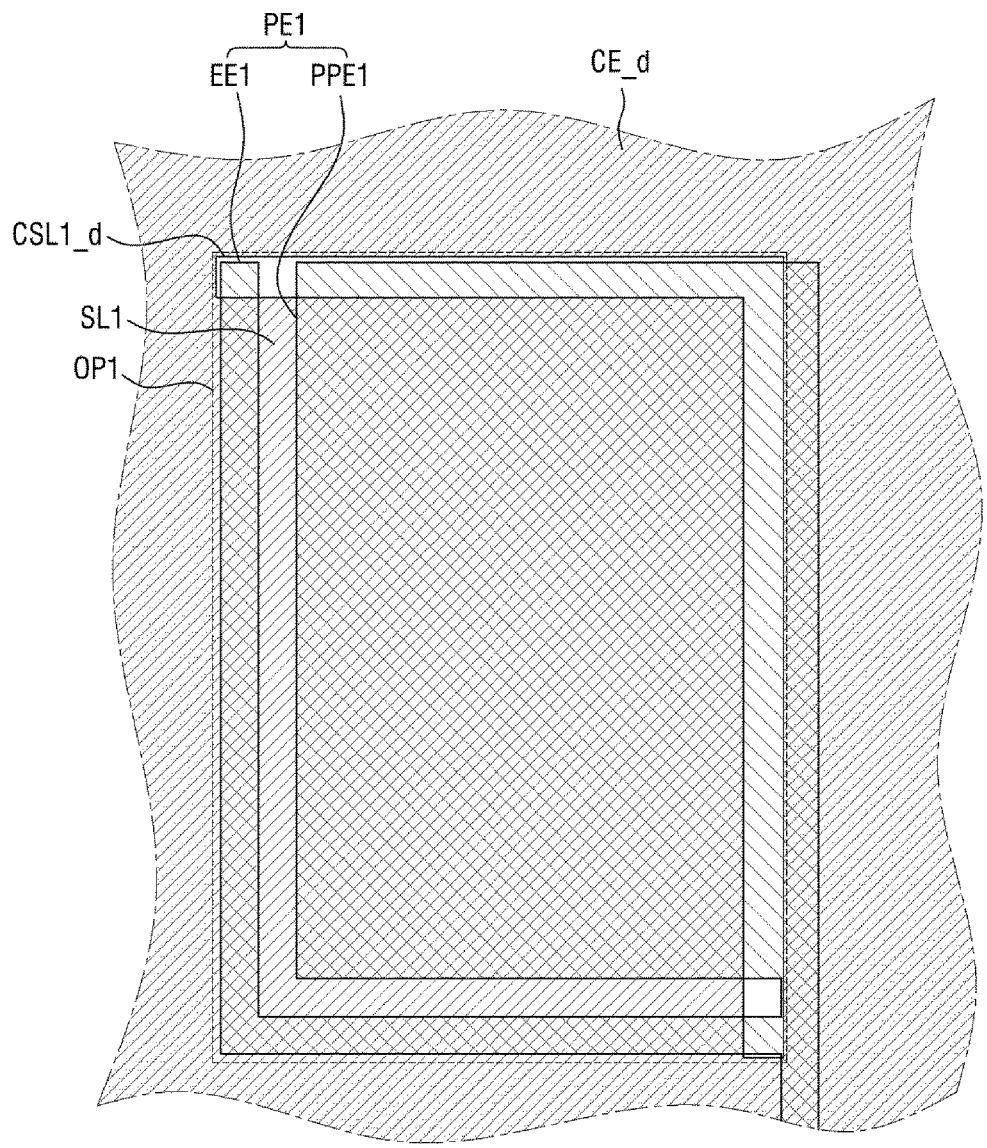
FIG. 10 is an enlarged layout view of a first opening region and a region around the first opening region in FIG. 9 according to some exemplary embodiments.

FIG. 9 is a cross-sectional view of a pixel unit PXU_d taken along a sectional line corresponding to the sectional line I-I' of FIG. 1 according to some exemplary embodiments. FIG. 10 is an enlarged layout view of a first opening region OP1 and a region around the first opening region in FIG. 9 according to some exemplary embodiments. In FIGS. 9 and 10, a description of elements and reference numerals identical or similar to those described above with reference to FIGS. 1 through 5 will be omitted, and primarily differences will be provided below.

Referring to FIGS. 9 and 10, the pixel unit PXU_d includes first, second, and third pixels PX1_d, PX2_d, and PX3_d. The first through third pixels PX1_d through PX3_d include a common electrode CE_d formed over the entire surface of the first through third pixels PX1_d through PX3_d. The common electrode CE_d includes first, second, and third common slit patterns CSL1_d, CLS2_d, and CSL3_d in regions corresponding to the first through third pixels PX1_d through PX3_d, respectively. The first through third common slit patterns CSL1_d through CSL3_d may be openings in which a transparent conductive material is not formed.

Hereinafter, the structure of the first pixel PX1_d will be mainly described as representative. That is, the description of the first pixel PX1_d may be applied to the second pixel PX2_d and the third pixel PX3_d.

The first common slit pattern CSL1_d may be disposed adjacent to outer sides of the first opening region OP1. For instance, the first common slit pattern CSL1_d may be disposed along outer sides of the first opening region OP1 on which a first edge electrode EE1 is not disposed. In some embodiments, the first edge electrode EE1 is inscribed in the first opening region OP1 to touch left and lower sides of the first opening region OP1 in the view of FIG. 10. On the other hand, the first common slit pattern CSL1_d may be inscribed in the first opening region OP1 to touch right and upper sides of the first opening region OP1.

The first common slit pattern CSL1_d may attract nearby liquid crystal molecules LC. The addition of the first common slit pattern CSL1_d may strength the force that tilts liquid crystal molecules LC overlapping the first opening region OP1 in a direction from a lower-left corner toward an upper-right corner. Accordingly, this can increase the control over the liquid crystal molecules LC of the first pixel PX1_d, improve the response speed, and increase the transmittance.

Figure 11:
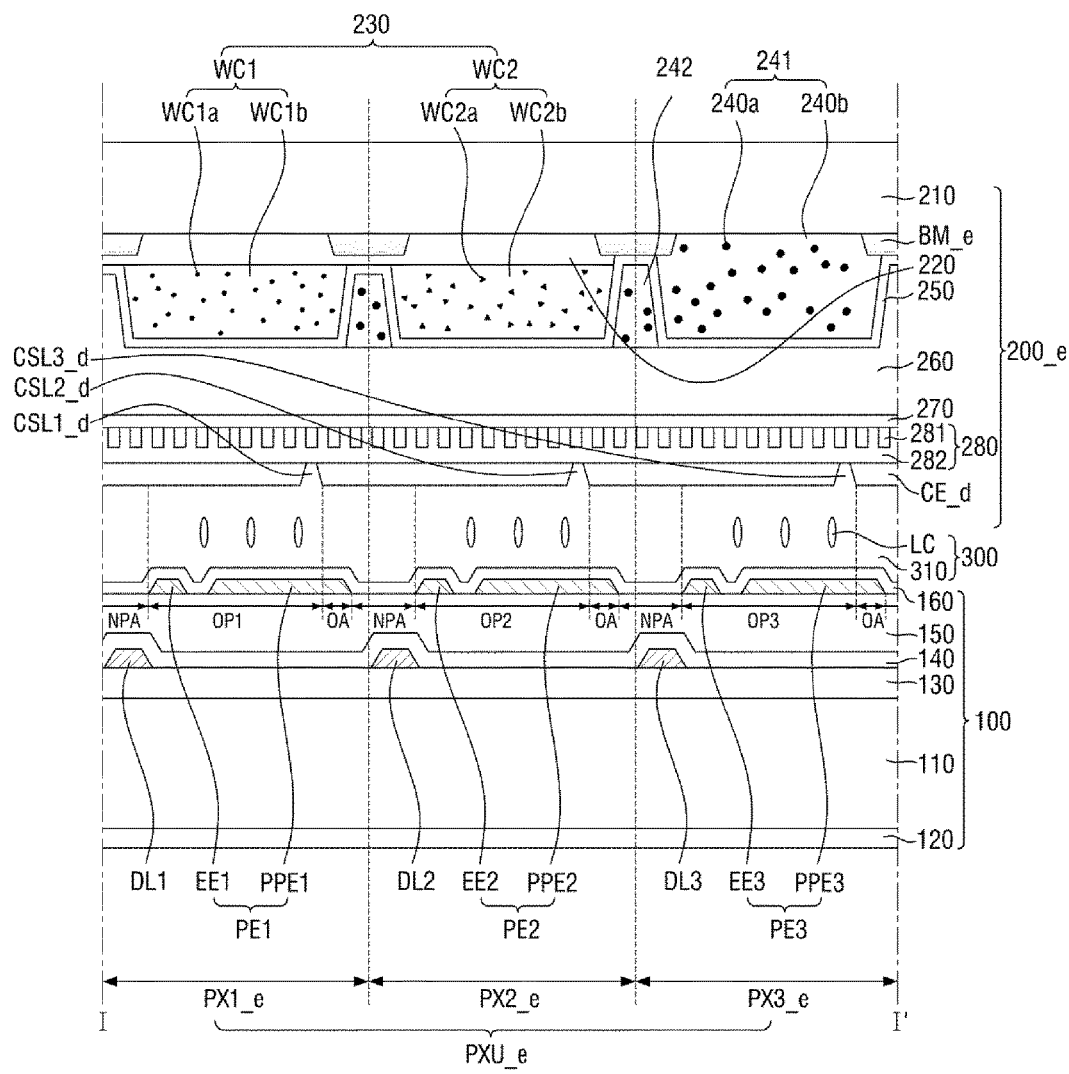
FIG. 11 is a cross-sectional view of a pixel unit taken along a sectional line corresponding to the sectional line I-I' of FIG. 1 according to some exemplary embodiments.

FIG. 11 is a cross-sectional view of a pixel unit PXU_e taken along a sectional line corresponding to the sectional line I-I' of FIG. 1 according to some exemplary embodiments. In FIG. 11, a description of elements and reference numerals identical or similar to those described above with reference to FIGS. 1 through 5, 9, and 10 will be omitted, and primarily differences will be described below.

Referring to FIG. 11, the pixel unit PXU_e includes first, second, and third pixels PX1_e, PX2_e, and PX3_e. The first through third pixels PX1_e through PX3_e include a common electrode CE_d and a light-blocking member BM_e formed over the entire surface of the first through third pixels PX1_e through PX3_e.

The common electrode CE_d includes first through third common slit patterns CSL1d through CSL3d in regions corresponding to the first through third pixels PX1_e through PX3_e, respectively. Since the first through third common slit patterns CSL1d through CSL3d have been described above with reference to FIGS. 9 and 10, they will not be described again.

The light-blocking member BM_e is disposed on a surface of an upper substrate 210 which faces a lower substrate 110. That is, the position of the light-blocking member BM_e in an upper display panel 200_e may be different from that of its counterpart in FIGS. 1, 2, 9, and 10. Since other features, such as the planar structure and material, of the light-blocking member BM_e have been previously described reference to FIGS. 1 through 5, they will not be described again. Accordingly, although the light-blocking member BM_e does not form a step in a liquid crystal layer 300, the common electrode CE_d plays some of the roles (e.g., alignment role) of the light-blocking member BM illustrated in FIGS. 1 through 5.

According to various exemplary embodiments, an LCD having maximized (or at least increased) transmittance can be provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display (LCD) comprising:
   a first substrate on which pixel regions are defined;
   a second substrate facing the first substrate;
   an alignment film disposed on a surface of the first substrate that faces the second substrate;
   a wavelength conversion layer disposed on a surface of the second substrate that faces the first substrate;
   a transmissive layer disposed on the surface of the second substrate;
   a common electrode disposed on surfaces of the wavelength conversion layer and the transmissive layer that face the first substrate;
   a light-blocking member disposed on a surface of the common electrode that faces the first substrate; and
   a liquid crystal layer disposed between the alignment film and the light-blocking member,
   wherein each pixel region among the pixel regions comprises:
      a pixel electrode disposed on the surface of the first substrate;
      an opening region in the light-blocking member; and
      a pixel overlap region outside the opening region, the pixel electrode overlapping the light-blocking member in the pixel overlap region.

2. The LCD of claim 1, wherein the pixel overlap region is adjacent to a first side of the opening region.

3. The LCD of claim 2, wherein the pixel electrode comprises:
   a surface electrode; and
   an edge electrode adjacent to a second side of the opening region, the second side being different from the first side.

4. The LCD of claim 3, wherein the opening region overlaps a portion of the surface electrode.

5. The LCD of claim 4, wherein the alignment film is aligned in a direction extending diagonally between the second side and the first side.

6. The LCD of claim 3, wherein the edge electrode extends along the second side and a third side extending between the first side and the second side.

7. The LCD of claim 3, wherein a portion of the surface electrode overlaps the light-blocking member in the pixel overlap region.

8. The LCD of claim 3, wherein a portion of the surface electrode is connected to the edge electrode in the pixel overlap region.

9. The LCD of claim 1, wherein the light-blocking member protrudes within the liquid crystal layer toward the first substrate.

10. The LCD of claim 9, wherein side walls of the light-blocking member are slopped with respect to a surface of the first substrate that faces the second substrate.

11. The LCD of claim 1, wherein a surface of the alignment film is rubbed along an alignment direction.

12. The LCD of claim 1, wherein the common electrode comprises a slit pattern defining an opening in the common electrode, the slit pattern being adjacent to a head-end of an alignment direction of the alignment film.

13. The LCD of claim 1, wherein the wavelength conversion layer comprises quantum dots or a phosphor.

14. The LCD of claim 13, wherein the wavelength conversion layer comprises:
   a first wavelength conversion layer configured to convert light of a first wavelength region into light of a second wavelength region different from the first wavelength region; and
   a second wavelength conversion layer configured to convert light of the first wavelength region into light of a third wavelength region different from the first wavelength region and the second wavelength region.

15. The LCD of claim 14, wherein the transmissive layer is configured to transmit light of the first wavelength region.

16. A liquid crystal display (LCD) comprising:
   a first substrate on which pixel regions are defined;
   a second substrate facing the first substrate;
   an alignment film disposed on a surface of the first substrate that faces the second substrate;
   a wavelength conversion layer disposed on a surface of the second substrate that faces the first substrate;
   a transmissive layer disposed on the surface of the second substrate;
   a common electrode disposed on surfaces of the wavelength conversion layer and the transmissive layer that face the first substrate;
   a liquid crystal layer disposed between the alignment film and the common electrode; and
   a light-blocking member disposed between the first substrate and the second substrate,
   wherein each pixel region among the pixel regions comprises:
      a pixel electrode disposed on the first substrate; and
      an opening region in the light-blocking member, and wherein the common electrode comprises a slit pattern defining an opening in the common electrode, the slit pattern being adjacent to a first side of the opening region.

17. The LCD of claim 16, wherein the pixel electrode comprises:
   a surface electrode; and
   an edge electrode adjacent to a second side of the opening region, the second side being different from the first side.

18. The LCD of claim 17, the opening region overlaps a portion of the surface electrode.

19. The LCD of claim 18, wherein the alignment film is aligned in a direction extending diagonally between the second side and the first side.

20. The LCD of claim 16, wherein the wavelength conversion layer comprises quantum dots or a phosphor.

* * * * *